US008769120B2

(12) United States Patent
Mueller et al.

(10) Patent No.: US 8,769,120 B2
(45) Date of Patent: Jul. 1, 2014

(54) METHOD AND SYSTEM TO MONITOR PARAMETERS OF A DATA FLOW PATH IN A COMMUNICATION SYSTEM

(75) Inventors: Wolfgang Mueller, Wiesloch (DE); Oumar Traore, Mannheim (DE); Michael Uckermann, Schwetzingen (DE)

(73) Assignee: SAP AG, Walldorf (DE)

( * ) Notice: Subject to any disclaimer, the term of this patent is extended or adjusted under 35 U.S.C. 154(b) by 2206 days.

(21) Appl. No.: 11/605,532

(22) Filed: Nov. 28, 2006

(65) Prior Publication Data

US 2008/0126534 A1    May 29, 2008

(51) Int. Cl.
G06F 15/16    (2006.01)
G06F 17/30    (2006.01)
G06F 3/00    (2006.01)

(52) U.S. Cl.
USPC ............ 709/228; 709/221; 709/222; 709/224

(58) Field of Classification Search
USPC .......................... 709/228, 220–222, 205, 227
See application file for complete search history.

(56) References Cited

U.S. PATENT DOCUMENTS

| 5,805,823 | A * | 9/1998 | Seitz ............................. 709/236 |
| 6,405,309 | B1 * | 6/2002 | Cheng et al. ...................... 713/1 |
| 7,079,548 | B1 * | 7/2006 | Walters et al. ................ 370/468 |
| 7,549,124 | B2 * | 6/2009 | DeLuca et al. ................ 715/736 |
| 2003/0229693 | A1 * | 12/2003 | Mahlik et al. ................. 709/224 |
| 2006/0069753 | A1 * | 3/2006 | Hu et al. ....................... 709/220 |
| 2006/0179150 | A1 * | 8/2006 | Farley et al. ................. 709/228 |
| 2007/0028001 | A1 * | 2/2007 | Phillips et al. ................ 709/238 |

OTHER PUBLICATIONS

Force Flow, Operating System Tweaks—Windows 2000/XP, Aug. 2, 2004, PC Mech, www.pcmech.com/article/operating-system-tweaks-windows-2000xp.*

* cited by examiner

*Primary Examiner* — Ruolei Zong
(74) *Attorney, Agent, or Firm* — Blakely, Sokoloff, Taylor & Zafman LLP

(57) ABSTRACT

A system and method of monitoring a dataflow path in a multilevel client server environment. A proxy is introduced into the dataflow path between a communication process on the client and the server. The proxy acts as a conduit in the data path and monitors the performance parameters of the dataflow. These parameters may then be visualized or used to adjust backend resources.

7 Claims, 3 Drawing Sheets

METHOD AND SYSTEM TO MONITOR PARAMETERS OF A DATA FLOW PATH IN A COMMUNICATION SYSTEM

BACKGROUND

1. Field

Embodiments of the invention relate to monitoring of performance parameters. More specifically, embodiments of the invention relate to monitoring performance parameters of a data flow path in a multi-level client server environment.

2. Background

Most existing operating systems provide a task manager. The task manager is basically a program or utility used to provide a user information about programs running on the computer. It can be used to display various common performance measures for processes operating on the computer. For example, a task manager may provide metrics for central processing unit (CPU) and memory usage, such as total number of handles, threads and processes running on the computer and the number of kilobytes of physical, kernel, and commit memory used. The task manager may also provide some information about networking performance. Some task managers provide a graphical representation such as a simple qualitative indicator that shows status of the networks on the computer. The representation may provide an indication of network traffic for the connections on a local computer and provide quick reference for determining an amount of network bandwidth consumed. Moreover, where multiple network connections exist, it allows comparison of traffic for each connection. However, the granularity at which task managers commonly provide such performance parameters is relatively coarse. For example, traffic is often determined over an interval of a second or more.

In some cases, the task manager may not provide access to all desired performance parameters. In other cases, the granularity provided by the task manager may be insufficient. For example, the in some client server environments it is desirable to monitor network operations at millisecond granularity. This level of granularity is not provided by existing task managers.

SUMMARY OF THE INVENTION

A system and method of monitoring a dataflow path in a multilevel client server environment is disclosed. A proxy is introduced into the dataflow path between a communication process on the client and the server. The proxy acts as a conduit in the data path and monitors the performance parameters of the dataflow. These parameters may then be visualized or used to adjust backend resources.

BRIEF DESCRIPTION OF DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
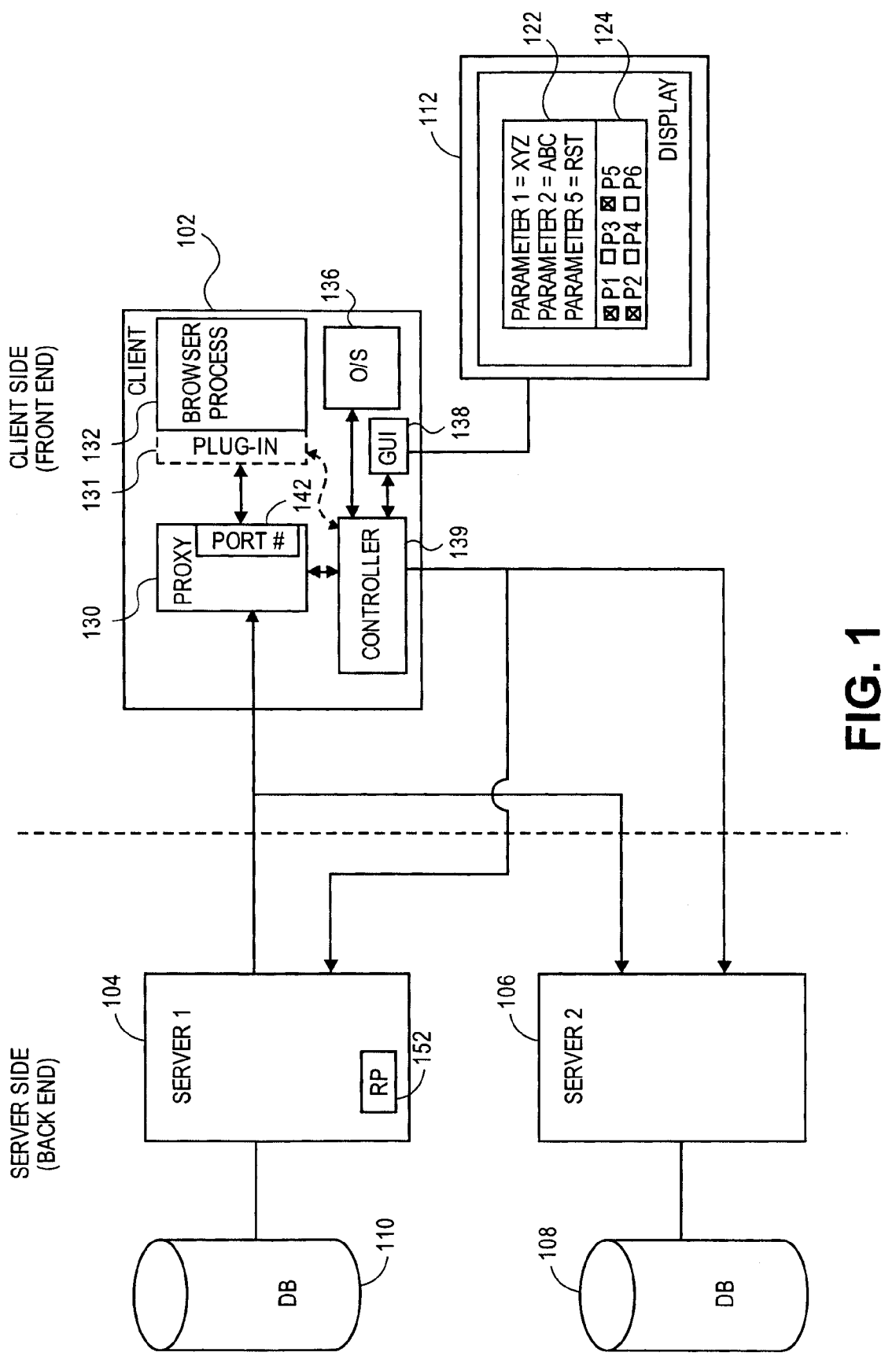
FIG. 1 is a block diagram of a system of one embodiment of the invention.

FIG. 1 is a block diagram of a system of one embodiment of the invention. A client 102 is coupled to one or more servers, such as first server 104 and second server 106. In one embodiment, server 104 may be a Java2 Enterprise Edition (J2EE) engine. Server 106 may be an advance business application programming (ABAP) server. Server types other than J2EE or ABAP may also be used. While two servers are shown, it is within the scope and contemplation of the invention that more or fewer servers may be used. Each server may be coupled to its own database, such as database 110 and database 108. In another embodiment, multiple servers may share a single database. The servers 104, 106 and database(s) 108, 110 are said to be on the server side (or backend) of the system.

Client 102 includes an operating system 136 and a communication process, such as browser process 132. In one embodiment, the proxy 130 and controller are platform independent. In various embodiments, browser process 132 may be any common browser, such as Internet Explorer available from Microsoft Corporation of Redmond, Wash., Safari available from Apple Computer, Inc. of Cupertino, Calif., Firefox available from Mozilla Foundation of Mountain View, Calif., etc. Client 102 may be coupled to display 112 to provide the user with visualization of activities occurring on the client 102. The client 102 and display 112 are said to be on the client side (or frontend) of the system.

In one embodiment of the invention, a controller 139 is provided within the client 102 to introduce a proxy 130 in the dataflow path between the browser process 132 and one or during more servers 104, 106. The combination of controller 139, proxy 130 and associate GUI 138 are referred to as the "frontend meter." The proxy 130 coordinated by the controller 139 monitors the data flow between the browser process 132 and the server(s) 104, 106 to identify performance parameters of the dataflow between the server(s) 104, 106 and the browser process 132.

To introduce the proxy 130 in the dataflow path between the communication process 132 and the server 104, 106, the controller 139 starts the proxy process 130 with an associated port number 142. The browser process 132 is then called and passed the port number 142 of the proxy 130. The browser process 132 communicates through the port having the specified port number. In this context, the proxy 130 acts as a conduit for the data flowing from the browser process 132 to the server 104, 106.

In this way, the proxy 130 is able to identify performance parameters, such as browser CPU time, hypertext transfer protocol (HTTP) data volume number of HTTP round trips and end-to-end response time. End to end response time is defined to include browser CPU time before download, HTTP download time and browser CPU time after download. These parameters are alternatively referred to herein as key performance indicators (KPI). Other parameters could also be monitored or tracked in various embodiments of the invention.

The controller 139 may obtain the performance parameters from the proxy and store them in persistent memory of either the first server 104, the second server 106 or both. Additionally, configuration information for the controller 139, proxy 130 and browser process 132 may be persisted to one or both of the databases 108, 110. This permits the controller 139, proxy 170 and browser process 132 to be returned to this prior saved configuration in the event of either a volitional or involitional restart. In one embodiment, server 104 includes a recovery process 152 to reinitiate the frontend meter from the persistently stored configuration data in the event of a client restart. In other embodiments, recovery process 152 may exist on more than one server.

A graphical user interface (GUI) 138 may also be provided and used by the controller to provide a visualization of the parameters tracked to the user. In addition to the parameters stored by the proxy from the dataflow path, controller 139 may also query one or more performance counters 137 from the operating system 136 to acquire additional performance parameters which may also be visualized using the GUI 138. In one embodiment, the GUI 138 causes the display 112 to display a parameter pane 122 including a selection pane 124 which permits a user to select which parameters he/she wishes to view. Identifying which parameters are desired in 124 is then signaled to the controller 139 and may influence which performance counters 137 of the operating system 106 it queries and which performance parameters from the proxy 130 the controller 139 passes to the GUI 138. In one embodiment, milisecond granularity can be achieved for at least some of the various performance parameters.

In one embodiment, a switchtable plugin 131 may be added in the browser 132. The plugin 131 should be very small to avoid negative impact on the performance parameters to be measured. The plugin 131 sends a message to the controller 139 indicating the number of HTTPs (Hypertext Transfer Protocol Secure) round trips that have occurred. In one embodiment, the message may be sent using a shared memory protocol, such as named pipes in Unix. This allows the system to distinctly track performance parameters of both HTTP and HTTPs transactions. Other embodiments may omit the plugin all together and rely solely on the proxy 130 to monitor the data flow as described above.

In some embodiments, proxy 130 may be configured to simulate slow networking environments. In this capacity, the proxy 130 introduces a delay of the data as it passes through the proxy 130 between the browser process 132 and server(s) 104, 108. This simulation can simulate both/either of bandwidth constraints on latency in the network.

In one embodiment, to minimize overhead associated with the introduction of the frontend meter, the GUI may permit selection and manipulation using key short cuts rather than requiring a change in focus between the browser window and the selection pane. Such focus changes inherently increase the load on the system, which changes the KPIs being measured. By eliminating the focus changes, the effect of the measurement tool on the measurements can be reduced.

In some embodiments, the controller 139 may evaluate the performance parameters to determine if they fall outside the acceptable limits. If one or more performance parameters fall outside the acceptable limits, the controller may send a signal to cause an automatic adjustment of the configuration of one or more backend resources. For example, the controller may force a change in a router configuration to provide greater bandwidth to a particular dataflow.

Figure 2:
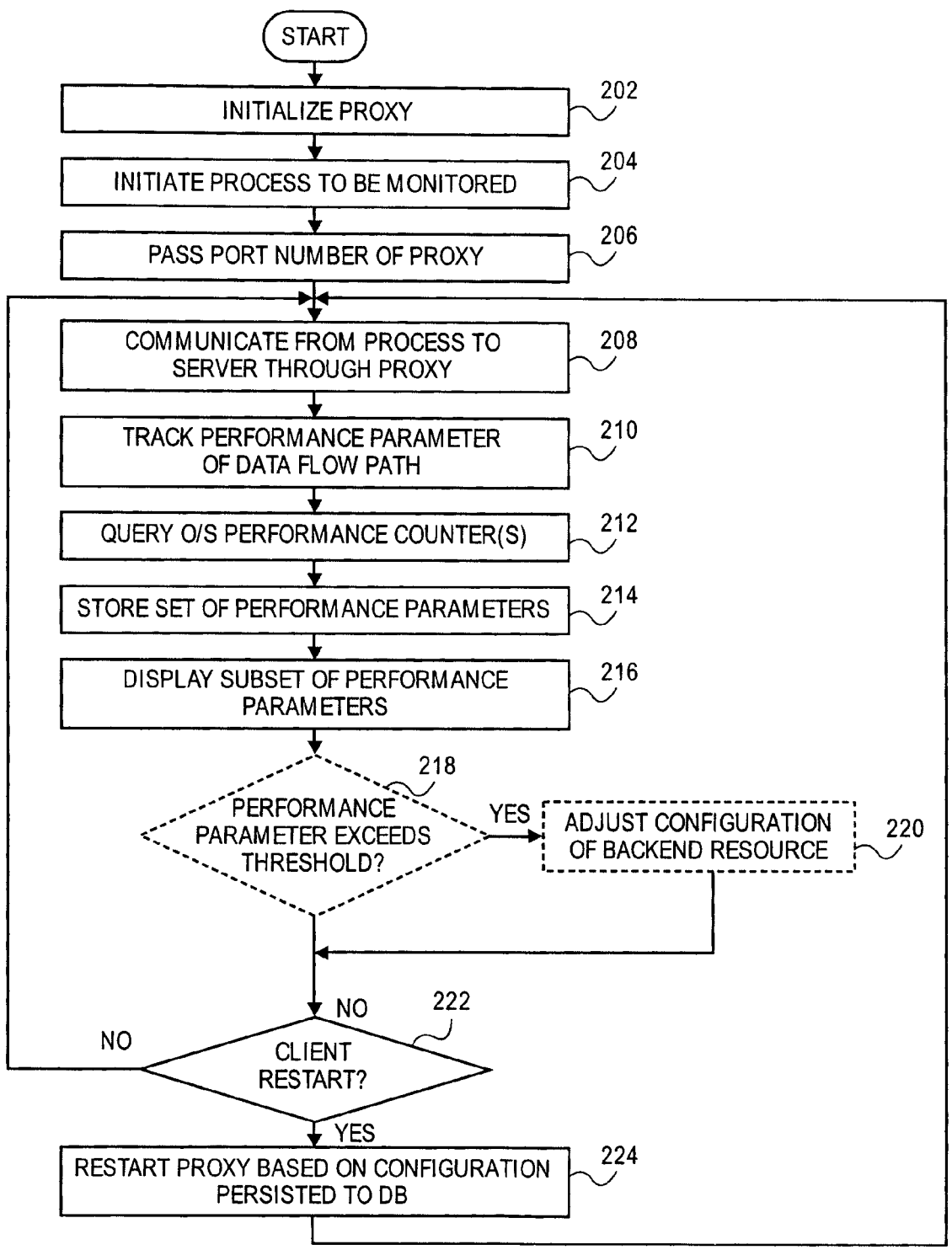
FIG. 2 is a flow diagram of operation in one embodiment of the invention.

FIG. 2 is a flow diagram of operation in one embodiment of the invention. At block 202, a controller initializes the proxy. At block 204 the process to be monitored, such as the communication (browser) process is initiated. The browser process is passed the port number of the proxy at block 206. Communication from the process to the server through the proxy occurs at block 208. The proxy tracks the performance parameters of the dataflow path at block 210 and reports those parameters to the controller.

The controller queries the O/S performance counters at block 212. In some embodiments, the performance counter to be queried may be user selectable through a GUI. In some embodiments, the performance parameters to be displayed may also be user selectable through the GUI. Server performance parameters are shared at block 214. In one embodiment, the set of performance parameters is persisted to a database on the backend (server side) of the client server environment. As used herein, "set," refers to any positive integer number of parameters. Similarly, subset, when modifying parameters, refers to any positive integer number of parameters. At block 216, the controller via the GUI causes the display of the subset of the performance parameters.

In some embodiments, the determination is made at block 218 whether the performance parameter exceeds a threshold. In such an embodiment, if the performance parameter exceeds the threshold, the controller may cause an automatic adjustment of configuration data of one or more backend resources at block 220. As used herein, "exceeds a threshold," is deemed to include falling outside of an expected bounded range. Thus, a performance parameter can "exceed a threshold" by being below a lower bound of that range. After adjustment of backend (server side) resource or if the performance parameter does not exceed the threshold, a determination is made at block 222 whether the client has restarted voluntarily or involuntarily. In either case, the configuration may be recovered from the persistent store and the client restarted with the prior configuration intact. At block 224, if no restart has occurred, communication may continue.

Figure 3:
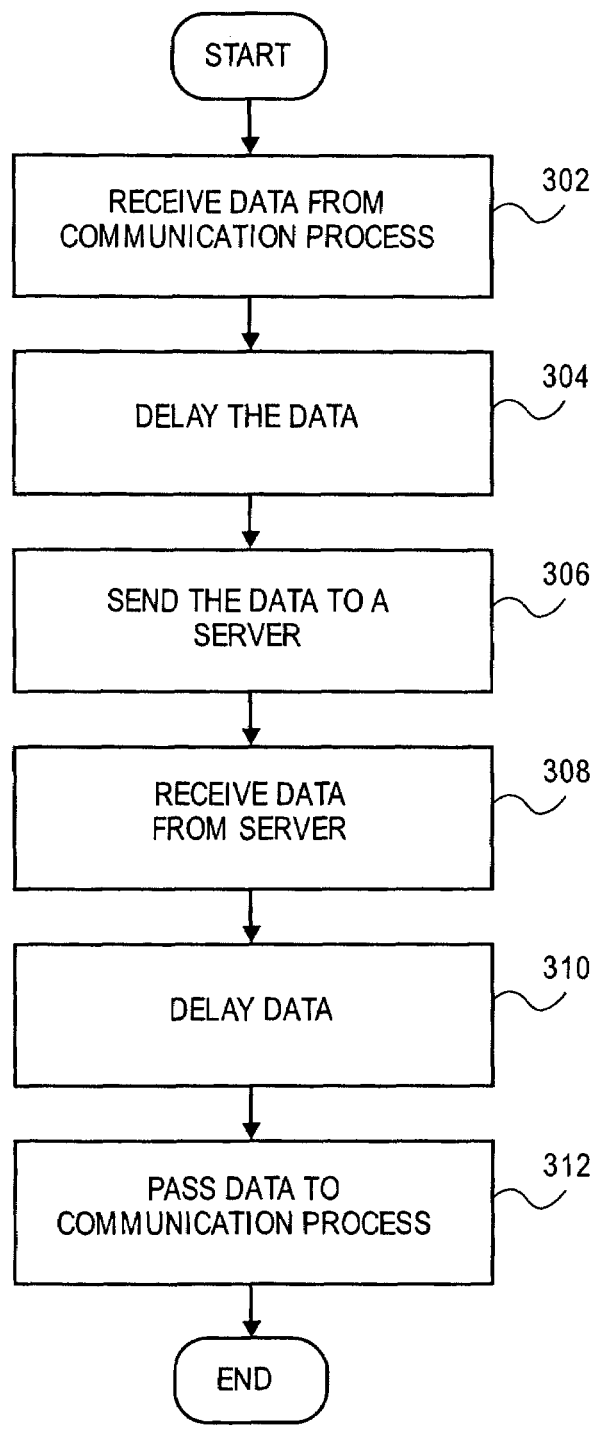
FIG. 3 is a flow diagram of operation in the proxy of one embodiment of the invention when simulating a slow networking environment.

FIG. 3 is a flow diagram of operation in the proxy of one embodiment of the invention when simulating a slow networking environment. This may be used to simulate either a bandwidth constrained or high latency network. At block 302, the proxy receives data from the communication process. At block 304, the proxy delays the data by the amount of time consistent with the desired network simulation. At block 306, the data is sent on to the server. At block 308, the proxy receives data from the server. That data is delayed at block 310. At block 312, the data is past to the communication process. In various embodiments, the delay at blocks 304 or 310 may be different amounts of time. In some cases, the delay may use zero for one block (e.g., block 310) and non zero for another (e.g., block 304). This provides significant simulation flexibility.

While the foregoing description uses flow charts to illustrate operational flow, it is expected that some of the operation may occur in an order different than illustrated and in some cases various operations may occur in parallel. Thus, these different ordering and/or parallel operations are deemed within the scope and contemplation of various embodiments of the invention.

Elements of embodiments may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cares, or other type of machine-readable media suitable for storing electronic instructions.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

In the foregoing specification, the invention has been described with reference to the specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A system comprising:
   a client including a communication process, a proxy to reside in a data flow path between the communication process and a server, the proxy to monitor performance parameters from the data flow path, and a controller to instantiate the proxy and obtain the performance parameters;
   at least one server to conduct transactions with the communication process; and
   a database coupled to the server to persistently store data from the controller.

2. The system of claim 1 further comprising:
   a graphical user interface to display a subset of the performance parameters.

3. The system of claim 2 wherein the GUI comprises:
   a selection pane to permit a user to select the subset of parameters.

4. The system of claim 1 wherein the client further comprises:
   an operating system including at least on performance counter, and wherein the controller is to query the performance counter for an additional performance parameter.

5. The system of claim 1 wherein the database persistently retains a configuration of the proxy.

6. The system of claim 1 wherein the communication process comprises:
   a browser process.

7. The system of claim 5 wherein the server comprises:
   a recovery process to reinitiate the proxy and the controller in the event of client restart.

* * * * *

UNITED STATES PATENT AND TRADEMARK OFFICE
CERTIFICATE OF CORRECTION

| | | |
|---|---|---|
| PATENT NO. | : 8,769,120 B2 | Page 1 of 1 |
| APPLICATION NO. | : 11/605532 | |
| DATED | : July 1, 2014 | |
| INVENTOR(S) | : Wolfgang Mueller, Oumar Traore and Michael Uckermann | |

It is certified that error appears in the above-identified patent and that said Letters Patent is hereby corrected as shown below:

In the Claims

Column 6, Claim 4, line 9, please delete "on" and insert --one--.

Signed and Sealed this
Twenty-eighth Day of October, 2014

Michelle K. Lee
*Deputy Director of the United States Patent and Trademark Office*